(12) United States Patent
Lam

(10) Patent No.: US 9,432,741 B2
(45) Date of Patent: Aug. 30, 2016

(54) METHOD AND SYSTEM OF USING INTELLIGENT MOBILE TERMINAL FOR CONTROLLING THE BROADCASTING OF NETWORK MULTI-MEDIA BROADCASTING DEVICE

(71) Applicant: Hiu Fung Lam, Hong Kong (HK)

(72) Inventor: Hiu Fung Lam, Hong Kong (HK)

(*) Notice: Subject to any disclaimer, the term of this patent is extended or adjusted under 35 U.S.C. 154(b) by 378 days.

(21) Appl. No.: 13/802,600

(22) Filed: Mar. 13, 2013

(65) Prior Publication Data
US 2013/0247108 A1    Sep. 19, 2013

(30) Foreign Application Priority Data

Mar. 13, 2012   (HK) .................................. 12102492

(51) Int. Cl.
| | |
|---|---|
| G06F 3/00 | (2006.01) |
| G06F 13/00 | (2006.01) |
| H04N 5/445 | (2011.01) |
| H04H 60/32 | (2008.01) |
| H04N 21/482 | (2011.01) |
| H04N 21/41 | (2011.01) |
| H04N 21/442 | (2011.01) |
| H04N 21/466 | (2011.01) |
| H04N 21/61 | (2011.01) |

(52) U.S. Cl.
CPC ...... *H04N 21/4823* (2013.01); *H04N 21/4126* (2013.01); *H04N 21/44222* (2013.01); *H04N 21/466* (2013.01); *H04N 21/482* (2013.01); *H04N 21/6181* (2013.01)

(58) Field of Classification Search
None
See application file for complete search history.

(56) References Cited

U.S. PATENT DOCUMENTS

| | | | |
|---|---|---|---|
| 6,847,778 B1* | 1/2005 | Vallone et al. | 386/344 |
| 7,712,125 B2* | 5/2010 | Herigstad et al. | 725/141 |
| 2007/0245024 A1* | 10/2007 | Prus et al. | 709/226 |
| 2008/0060012 A1* | 3/2008 | Rydenhag | 725/46 |
| 2010/0017736 A1* | 1/2010 | Kim | 715/771 |
| 2010/0122296 A1* | 5/2010 | Beyabani et al. | 725/46 |
| 2011/0126231 A1* | 5/2011 | Ko | 725/39 |
| 2012/0033140 A1* | 2/2012 | Xu | 348/734 |
| 2013/0132848 A1* | 5/2013 | Bhatt | 715/733 |

* cited by examiner

*Primary Examiner* — Nathan Flynn
*Assistant Examiner* — William J Kim

(57) ABSTRACT

The present application is directed to a method and system of controlling the broadcasting of network multi-media broadcasting device comprising the steps of, adding at least one channel or application on a main user interface; determining whether the user has selected one of the channels or applications, if so, setting the channel or application as selected by the user as an auto launch item; if not, selecting the channel or application with the highest priority as the auto launch item; determining whether the channel or application possessing the highest CTR or longest broadcasted time; if so, selecting among the channels or applications having the highest CTR or longest broadcasted time and setting it as an auto launch item; if not, giving the highest priority to the sole channel or application having the highest CTR or longest broadcasted time and setting it as the auto launch item.

19 Claims, 4 Drawing Sheets

METHOD AND SYSTEM OF USING INTELLIGENT MOBILE TERMINAL FOR CONTROLLING THE BROADCASTING OF NETWORK MULTI-MEDIA BROADCASTING DEVICE

FIELD OF THE TECHNOLOGY

The present application is directed to a method and system of controlling the broadcasting of network multi-media broadcasting device. More specifically, it is directed to a method and system of using intelligent mobile terminal for controlling the broadcasting of network multi-media broadcasting device. This application claims the benefit of Hong Kong Short-Term Patent Application No. 12102492.5 filed on Mar. 13, 2012, the contents of which is hereby incorporated by reference.

BACKGROUND

When the current network multi-media broadcasting device is providing online program contents for users, the intelligent mobile terminal cannot be used to control the network multi-media broadcasting. Users are not able to use the intelligent mobile terminal to perform content menu control of the network multi-media broadcasting device. It is not possible for the users to add favorite channels and application list and set auto launch items. Furthermore, the above cannot provide users with program contents in a user-friendly manner. Typically, when users obtain programs through network TV online, a downloading bar for the buffering and loading progress will be shown, meaning that certain amount of waiting time is required to receive the information before the broadcasted program can be viewed.

SUMMARY

According to the present application, there is provided a method for controlling a broadcasting of network multi-media broadcasting device using intelligent mobile terminal, comprising the steps of, 1) adding at least one channel or application on a main user interface of a network multi-media broadcasting device through a control menu application program that is executed on an intelligent mobile terminal; 2) determining whether the user has selected one of the channels or applications, if so, setting the channel or application as selected by the user as an auto launch item; if not, 3) selecting the channel or application with the highest priority as the auto launch item; 4) determining whether the channel or application possessing the highest click through rate or longest broadcasted time is greater than one; if so, (5) selecting among the channels or applications having the highest click through rate or longest broadcasted time which is first to be broadcasted is assigned first priority and giving it the highest priority and setting it as an auto launch item; if not, (6) giving the highest priority to the sole channel or application having the highest click through rate or longest broadcasted time and setting it as the auto launch item.

Accordingly to another aspect of the present application, there is provided a method for controlling a broadcasting of network multi-media broadcasting device using intelligent mobile terminal, wherein the network multi-media broadcasting device is powered on, the auto launch item is immediately initiated. Furthermore, priority is determined by comparing a click through rate of the channel/application on the main user interface or the broadcasted time of the channel/application.

In another exemplary embodiment, a control menu application program is downloaded from the server by the intelligent mobile terminal for controlling the content menu of the network multi-media broadcasting device, and wherein one control menu application program correspondingly controls one content menu, and wherein the control menu application program comprises mouse cursor and/or virtual keyboard allowing the user to control the content menu displayed by the network multi-media broadcasting device.

As an example, the network multi-media broadcasting device provides multi-media content comprising at least a channel or an application, wherein the channel or application comprises at least one of TV program, movie, IPTV (Internet Protocol television), on-line shop, TV application, MTV (Music Television), game, electronic books, music, radio program or on-line game. The network multi-media broadcasting device broadcasts the program content received and at the same time displays the buffering status of the program content that is being executed.

In an embodiment, data streaming of the program content being buffered is controlled for initialization, and wherein the program content is being broadcasted, control management is performed on the data stream of the program content. Further, the intelligent mobile terminal controls the network multi-media broadcasting device for obtaining program content from a server, the server obtains information or status of the program content being broadcasted by the network multi-media broadcasting device. When the network multi-media broadcasting device is shut down or the connection between the network multi-media broadcasting device and the server is interrupted, the intelligent mobile terminal controls the buffering process.

As examples, the intelligent mobile terminal may be a smart phone or a tablet computer, and the server is a cloud server, wherein the intelligent mobile terminal performs wireless communication with the network multi-media broadcasting device and the server, and the network multi-media broadcasting device performs wired or wireless communication with the server, and wherein the wireless communication is via Wi-Fi, Zigbee, BT (Bluetooth), BLE (Bluetooth low energy), RF4CE (Radio Frequency for Consumer Electronics), or 2.46 Hz RF.

According to another aspect of the present application, there is provided a system for controlling a broadcasting of network multi-media broadcasting device using intelligent mobile terminal, comprising a intelligent mobile terminal, a network multi-media broadcasting device and a server, wherein through executing a control menu application program on the intelligent mobile terminal, at least one channel or application is added on a main user interface of the network multi-media broadcasting device. When a user selects one channel or application, the channel or application is set as an auto launch item such that the auto launch item is immediately initiated once powered is on. The channel or application with highest priority is selected as auto launch item, wherein priority is determined by comparing the click through rates of the channels or applications on the main user interface or the broadcasted time of the channels or applications. Only one channel or application having the highest click through rate or longest broadcasted time is given highest priority and is set as auto launch item. For multiple channels or applications having same highest click through rate or broadcasted time, a first priority is selected among the channels or applications having equally high click through rate or long broadcasted time and is given highest priority and set as auto launch item. Nevertheless, first priority is given to channel or application that is broadcasted first and with the highest click through rate or longest broadcasted time.

Accordingly to yet another aspect of the present application, there is provided a system for controlling the broadcasting of network multi-media broadcasting device using intelligent mobile terminal, wherein a control menu application program is downloaded from a server by the intelligent mobile terminal for controlling the content menu of the network multi-media broadcasting device, and wherein the control menu application program correspondingly controls one control menu; after the control menu application program is executed on the intelligent mobile terminal, the control menu application program provides a mouse cursor and/or a virtual keyboard allowing the user to control the content menu displayed by the network multi-media broadcasting device.

As an example, the network multi-media broadcasting device provides multi-media content comprising at least a channel or an application, and wherein the channel or application comprises at least one of TV program, movie, IPTV, on-line shop, TV application, MTV, game, electronic books, music, radio program or on-line game. The network multi-media broadcasting device broadcasts the program content received and at the same time displays the buffering status of the program content that is being executed.

In another embodiment, data streaming of the program content being buffered is controlled for initialization, and wherein the program content is being broadcasted, control management is performed on the data stream of the program content. The intelligent mobile terminal controls the network multi-media broadcasting device for obtaining program content from a server, the server obtains information or status of the program content being broadcasted by the network multi-media broadcasting device. When the network multi-media broadcasting device is shut down or the connection between the network multi-media broadcasting device and the server is interrupted, the intelligent mobile terminal controls the buffering process.

In another exemplary embodiment, the intelligent mobile terminal performs wireless communication with the network multi-media broadcasting device and the server, and the network multi-media broadcasting device performs wired or wireless communication with the server, and wherein the wireless communication may be via Wi-Fi, Zigbee, BT, BLE, RF4CE, or 2.46 Hz RF. The network multi-media broadcasting device may be a network TV or a combination of a multi-media box and a TV, wherein the network TV comprises a central processor, and a memory, a wireless communication module, a monitor, a LAN interface module, an IR interface module and an RF interface module that electrically connect with the central processor respectively, and the multi-media box comprises a housing on which is provided with a HDMI interface, a sequence interface, an external memory socket and a power source interface.

DESCRIPTION OF THE DRAWINGS

Below is a further explanation of the present application in combination of the drawings and embodiments, in the drawings.

DETAILED DESCRIPTION

Figure 1:
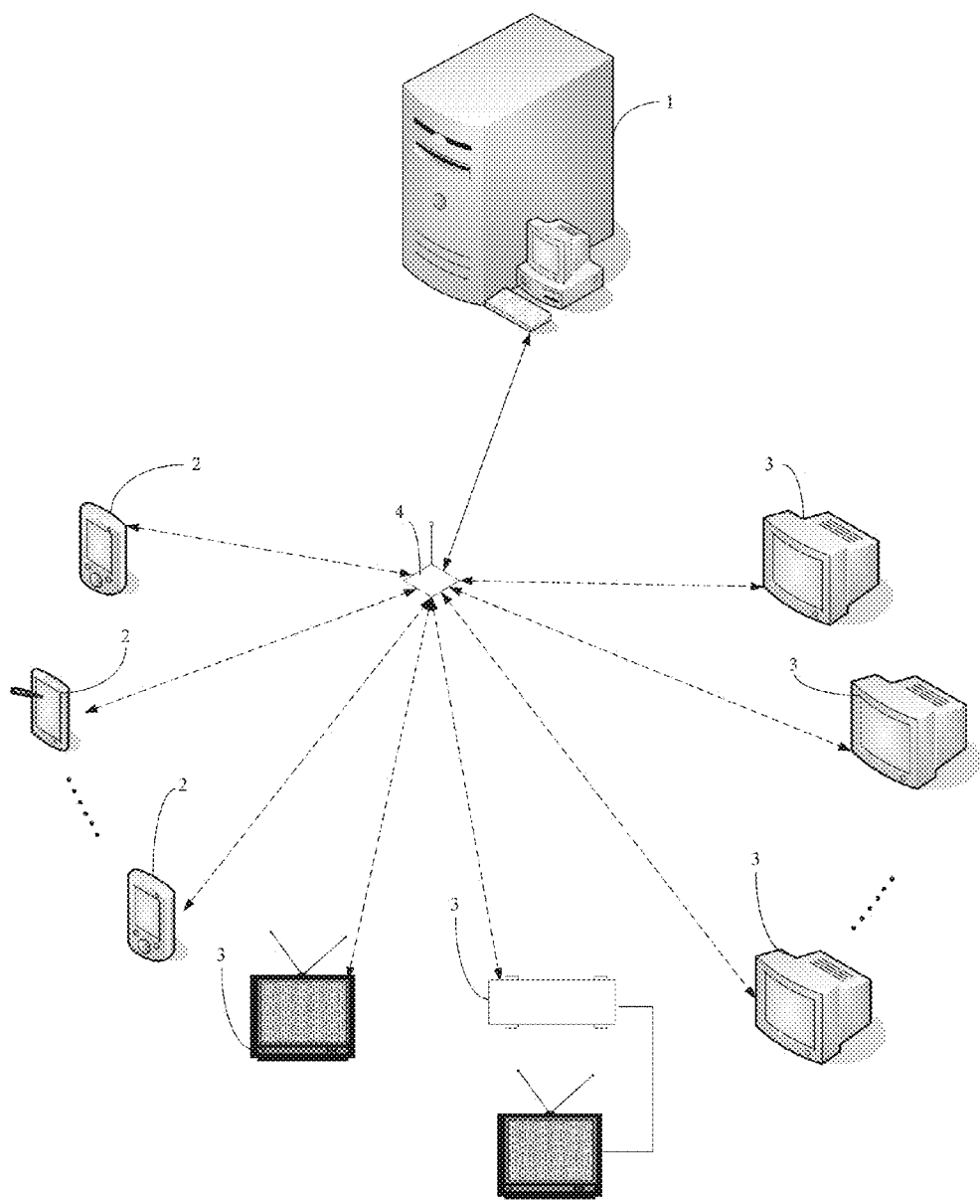
FIG. 1 is a structural frame schematic diagram of a first embodiment of a system for controlling the broadcasting to the network multi-media broadcasting device using intelligent mobile terminal of the present application.
Figure 2:
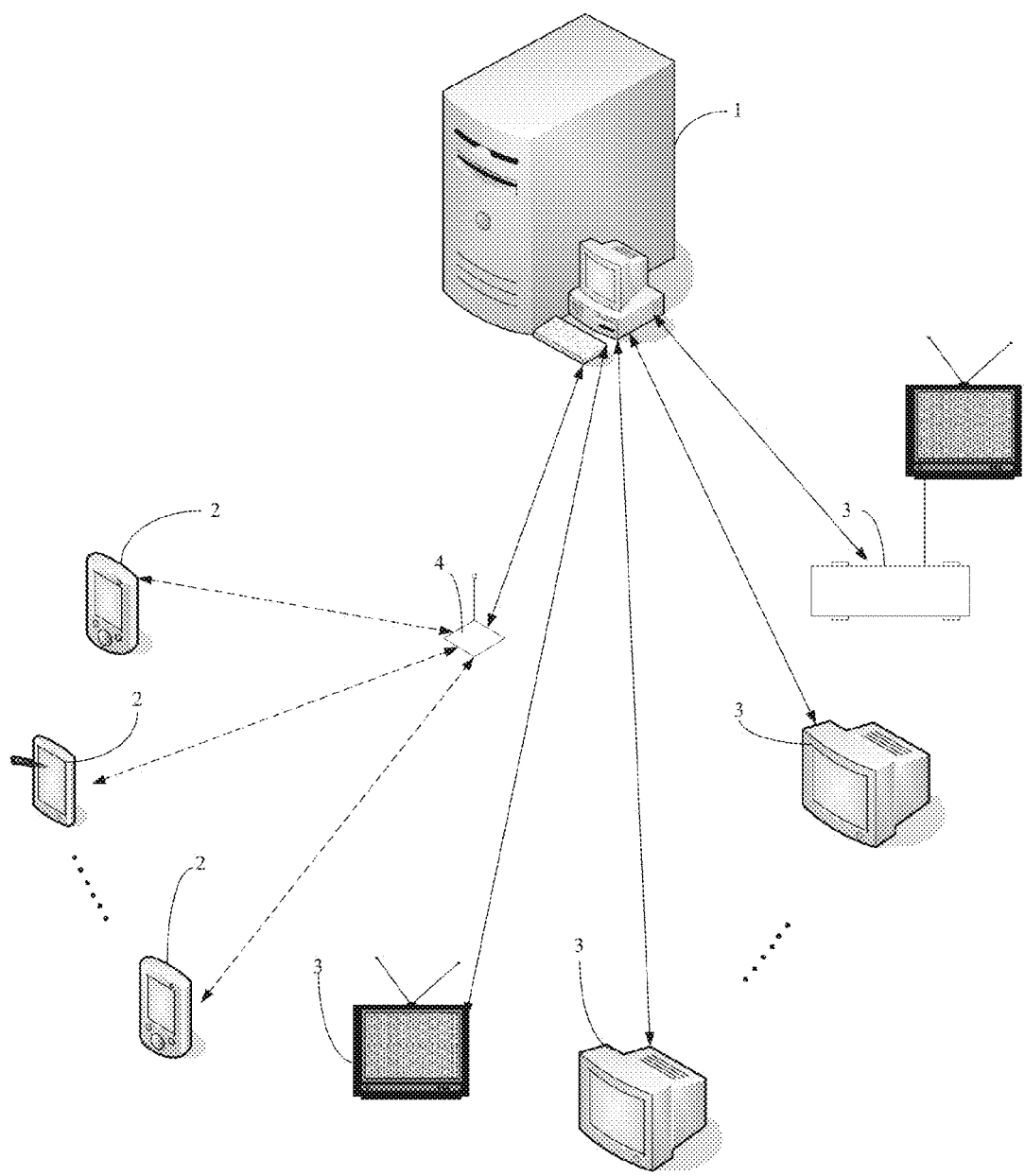
FIG. 2 is a structural frame schematic diagram of a second embodiment of a system for controlling the broadcasting of the network multi-media broadcasting device using intelligent mobile terminal of the present application.

As FIGS. 1 and 2 illustrate, the system that performs control in broadcasting to the network multi-media broadcasting device using the intelligent mobile terminal of the present application mainly includes an intelligent mobile terminal 2, a network multi-media broadcasting device 3 and a server 1. During the operating process, the intelligent mobile terminal 2 and the server 1 perform wireless communication. Specifically, server 1 connects with wireless router 4 through cables, follow by utilizing wireless router 4 to achieve wireless communication. As FIGS. 1 and 2 illustrate, the intelligent mobile terminal 2 can merely be the only one, or be in any number N according to actual application needs. Typically, the intelligent mobile terminal may be a personal digital assistant (PDA), smart phone, smart tablet, etc. Therefore, the protection scope of the present application should not be limited to a certain specific type of intelligent mobile terminal. It is appreciated that server 1 may be a cloud server, or may be other types of servers having massive information processing capability. The same may be one set of server and multiple sets of servers assembled as a server component. In addition, the wireless communication is via Wi-Fi, Zigbee, BT, BLE, RF4CE or 2.46 Hz RF communication. The network multi-media broadcasting device 3 may be a network TV, or combination of multi-media box and TV (network TV or common TV). The main user interface of the network multi-media broadcasting device is provided with user's favorite channels or applications.

Furthermore, the amount and type of network multi-media broadcasting device 3 may be flexibly designed according to actual needs. As FIGS. 1 and 2 illustrate, network multi-media broadcasting device 3 may merely be the only one, or in any number N according to actual application needs. The network multi-media broadcasting device 3 may produce audio visual broadcasting device having network communication capability for different manufacturers, while the network multi-media broadcasting device 3 may be selected to wired communicate or wireless communicate with the server 1. As FIG. 1 illustrates, network multi-media broadcasting device 3 and the server 1 perform wireless communication, which is, the network multi-media broadcasting device 3 realizes the communication with information of the server 1 through wireless router 4. As FIG. 2 illustrates, network multi-media broadcasting device 3 and the server 1 perform wire communication. At this time, it is not necessary for the network multi-media broadcasting device 3 to perform information communication with the server 1 through wireless router 4. Instead, the network multi-media broadcasting device 3 directly utilizes wire cable to perform communication connection with the server 1. It is appreciated that no matter whether the communication method between the network multi-media broadcasting device 3 and the server 1 is wired or wireless, the network multi-media broadcasting device 3 and the intelligent mobile terminal 2 communicate wirelessly. Therefore, intelligent mobile terminal 2 is able to achieve remote operation for the network multi-media broadcasting device 3.

Figure 3:
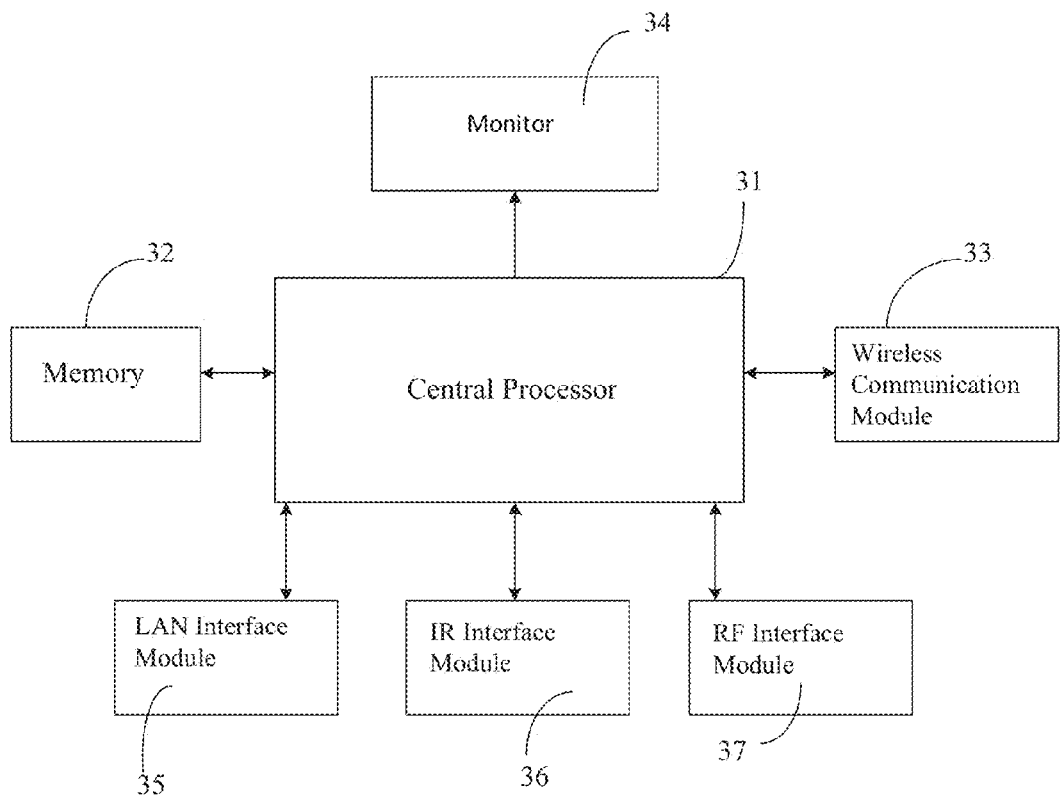
FIG. 3 is a structural schematic diagram of a network TV of the present application.

As FIG. 3 illustrates, when the network multi-media broadcasting device is a network TV, the network TV may include central processor 31 and memory 32, wireless communication module 33, monitor 34, LAN interface module 35, IR interface module 36 and RF interface module 37 that electrically connect with the central processor 31 respectively. The central processor 31 is the information processing center of the network TV. Memory 32 stores different control names, pre-set demands and program contents. The wireless communication module 33 realizes wireless communication capability of the network TV. LAN interface module 35 realizes wired communication capability of the network TV, that is, the electrical wire connection within the LAN. IR interface module 36 realizes the infrared remote operation of the network TV 3 by the intelligent mobile terminal 2. RF interface module 37 realizes the RF communication of the network TV. It is appreciated that the program contents received by the network TV 3 may be TV programs, movies, electronic books, music, radio programs or online games, etc.

Figure 4:
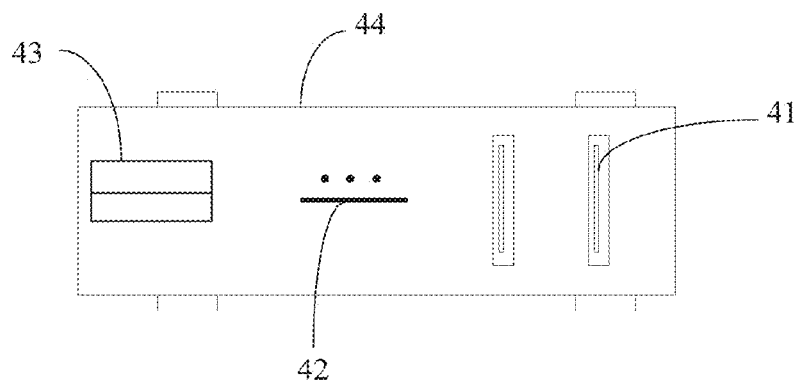
FIG. 4 is a structural schematic diagram of a media box of the present application.

As FIG. 4 illustrates, when the network multi-media broadcasting device is formed from a multi-media box and a TV, the intelligent mobile terminal 2 controls the multi-media box. The multi-media box broadcasts the received audio/video information through the TV that it connects. It is appreciated that the multi-media box includes housing 44. On the housing 44 HDMI interface (used to connect with the TV), sequence interface 41, external memory socket 42 and power source interface 43 are provided. Relevant integrated circuit boards are provided inside the housing 44 to perform all sorts of information processing and analysis.

During operation, the intelligent mobile terminal 2 downloads the application program from server 1 for controlling the control menu of the content menu of the multimedia broadcasting device 3. One control menu application program correspondingly controls one content menu. After launching the control menu application program on the intelligent mobile terminal 2, mouse cursor and/or virtual keyboard will be formed on the application program interface. At the same time, the mouse cursor will be shown on the content menu of the multi-media broadcasting device 3. The two mouse cursors interact through touching the mouse cursor and/or virtual keyboard on the intelligent mobile terminal 2 by the user, controlling is achieved on the content menu displayed on the network multi-media broadcasting device 3. The network multi-media broadcasting device provides many types of multi-media contents. Each type of multi-media content includes various channels or applications. The multi-media contents are TV programs, movies, IPTV, on-line shops, TV applications, music channels, games, electronic books, music, radio programs or on-line games.

During specific operation, through the operation of the control menu application program on the intelligent mobile terminal 2, users may add at least one channel or application on the main user interface of the network multi-media broadcasting device 3. When users finally select one channel or application, the channel or application selected by the users becomes an auto-launch item so that when the power is turned on for the network multi-media broadcasting device 2, auto-launch item immediately initiates. Alternatively, the channels or applications at the highest priority may be selected as auto-launch items. Wherein, the priorities may be determined through comparing the channels on the interface or applied click through rate (CTR) of those channels or applied broadcasting time of the users. When only one channel or application possesses the highest CTR or longest broadcasted time, the highest priority is given to the sole channel or application with the highest CTR or longest broadcasted time, the same is set as an auto launch item. When there are multiple channels or applications having equally high CTR or long broadcasted time, first priority is selected among these channels or applications having the highest CTR or longest broadcasted time. Highest priority is given and auto launch items are set for these channels/applications. Channels or applications of the highest CTR or longest broadcasted time to be broadcasted first are set as the first priority.

Furthermore, the network multi-media broadcasting device 3 broadcasts the program content received and displays the buffering status of the program content being currently executed. The data flow of the program content is buffered and controlled at preliminary stage in order to prepare initialization of the content to be broadcasted. After the broadcast of the program content began, control management of the continue data flow received is performed in order to select to either broadcast or buffer the program information received. The intelligent mobile terminal 2 is used to control the network multi-media broadcasting device 3 and the program content is obtained from the server 1. The server 1 may obtain the program information and status of the network multi-media broadcasting device 3 being broadcasted at the moment. In the case that the network multi-media broadcasting device is shut down or the connection between network multi-media broadcasting device and the server is interrupted when the TV program is being broadcasted through the network multi-media device 3, the intelligent mobile terminal may be used to control the buffering process.

Figure 5:
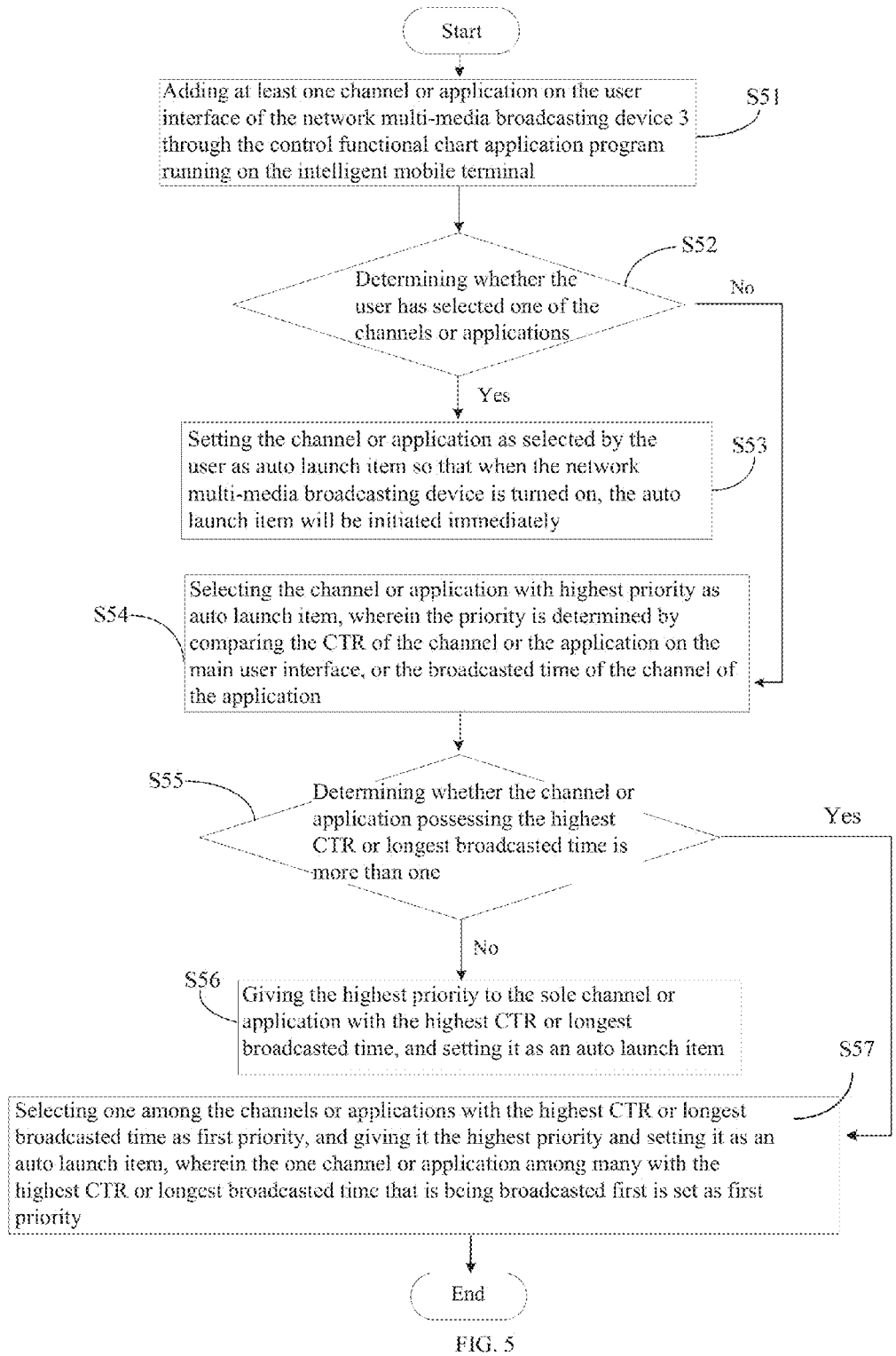
FIG. 5 is a method flowchart showing the control of the broadcasting to the network multi-media broadcasting device using intelligent mobile terminal of the present application.

As FIG. 5 illustrates, the present application applies the intelligent mobile terminal to perform the process of the broadcasting control to the network multi-media broadcasting device. Such process is based on the system structure as illustrated in FIGS. 1 and 2, the specific procedure is as follows:

S51: Users may add at least one channel or application on the user interface of the network multi-media broadcasting device 3 through the control functional chart application program running on the intelligent mobile terminal 2. The added channel or application may be all types of programs that are most preferably watched by the users.

S52: Determining whether the user has selected one of the channels or applications, if so, then enter into procedure S53, if not, enter into procedure S54.

S53: Setting the channel or application as selected by the user as auto launch item so that when the network multi-media broadcasting device 3 is turned on, the auto launch item will be initiated immediately.

S54: Selecting the channel or application with highest priority as auto launch item, wherein the priority is determined by comparing the CTR of the channel or the application on the main user interface, or the broadcasted time of the channel of the application.

S55: Determining whether the channel or application possessing the highest CTR or longest broadcasted time is more than one, if so, then enter into procedure S57, if not, then enter into procedure S56.

S56: Giving the highest priority to the sole channel or application with the highest CTR or longest broadcasted time, and setting it as an auto launch item.

S57: Selecting one among the channels or applications with the highest CTR or longest broadcasted time as first priority, and giving it the highest priority and setting it as an auto launch item, wherein the one channel or application among many with the highest CTR or longest broadcasted time that is being broadcasted first is set as first priority.

The above is the relatively preferred embodiment of the present application, and does not limit the present application. Any amendment or equivalent replacement and improvement as such that falls within the spirit and principle of the present application are to be included within the scope of protection of the present application.

What is claimed is:

1. A method for controlling a broadcasting of a network multi-media broadcasting device using an intelligent mobile terminal, comprising the steps of:
    adding at least one channel or application on a main user interface of a network multi-media broadcasting device through a control menu application program that is executed on an intelligent mobile terminal;
    determining whether a user has selected one of the at least one channels or applications, if so, setting the channel or application as selected by the user as an auto launch item;
    if not, selecting a channel or application with a highest priority as the auto launch item;
    determining whether there is more than one channel or application possessing a highest click through rate or longest broadcasted time;
    if so, selecting a channel or application having an earliest broadcast start time among the channels or applications having the highest click through rate or longest broadcasted time, assigning the channel or application having the earliest broadcast start time among the channels or applications having the highest click through rate or longest broadcasted time first priority, and giving the channel or application having the earliest broadcast start time the highest priority and setting the channel or application having the earliest broadcast start time as the auto launch item;
    if not, giving the highest priority to the sole channel or application having the highest click through rate or longest broadcasted time and setting the sole channel or application having the highest click through rate or longest broadcasted time as the auto launch item.

2. The method for controlling the broadcasting of the network multi-media broadcasting device using the intelligent mobile terminal according to claim 1, wherein when the network multi-media broadcasting device is powered on, the auto launch item is immediately initiated.

3. The method for controlling the broadcasting of the network multi-media broadcasting device using the intelligent mobile terminal according to claim 1, wherein the control menu application program that is executed on the intelligent mobile terminal is downloaded from a server by the intelligent mobile terminal for controlling a content menu of the network multi-media broadcasting device, and wherein one control menu application program correspondingly controls one content menu, and wherein the control menu application program comprises a mouse cursor and/or a virtual keyboard allowing the user to control the content menu displayed by the network multi-media broadcasting device.

4. The method for controlling the broadcasting of the network multi-media broadcasting device using the intelligent mobile terminal according to claim 1, wherein the network multi-media broadcasting device provides multi-media content comprising at least a channel or an application.

5. The method for controlling the broadcasting of the network multi-media broadcasting device using the intelligent mobile terminal according to claim 4, wherein the channel or application comprises at least one of TV program, movie, Internet Protocol television (IPTV), on-line shop, TV application, Music Television (MTV), game, electronic books, music, radio program or on-line game.

6. The method for controlling the broadcasting of the network multi-media broadcasting device using the intelligent mobile terminal according to claim 1, wherein the network multi-media broadcasting device broadcasts program content received and at the same time displays a buffering status of program content that is being executed.

7. The method for controlling the broadcasting of the network multi-media broadcasting device using the intelligent mobile terminal according to claim 1, wherein data streaming of program content being buffered is controlled for initialization, and when the program content is being broadcasted, control management is performed on the data stream of the program content.

8. The method for controlling the broadcasting of the network multi-media broadcasting device using the intelligent mobile terminal according to claim 1, wherein the intelligent mobile terminal controls the network multi-media broadcasting device for obtaining program content from a server, the server obtains information or status of the program content being broadcasted by the network multi-media broadcasting device.

9. The method for controlling the broadcasting of the network multi-media broadcasting device using the intelligent mobile terminal according to claim 8, wherein the intelligent mobile terminal controls a buffering process of the network multi-media broadcasting device, wherein the intelligent mobile terminal is a smart phone or a tablet computer, and the server is a cloud server, wherein the intelligent mobile terminal performs wireless communication with the network multi-media broadcasting device and the server, and the network multi-media broadcasting device performs wired or wireless communication with the server, and wherein the wireless communications between the intelligent mobile terminal and the network multi-media broadcasting device, between the intelligent mobile terminal and the server, and between the network multi-media broadcasting device and the server are via Wi-Fi, Zigbee, Bluetooth (BT), Bluetooth low energy (BLE), Radio Frequency for Consumer Electronics (RF4CE), or 2.46 Hz RF.

10. A system for controlling a broadcasting of a network multi-media broadcasting device using an intelligent mobile terminal, comprising: an intelligent mobile terminal, a network multi-media broadcasting device and a server, wherein through executing a control menu application program on the intelligent mobile terminal, at least one channel or application is added on a main user interface of the network multi-media broadcasting device;
    wherein when a user selects one channel or application, the channel or application selected by the user is set as an auto launch item such that the auto launch item is immediately initiated once the network multi-media broadcasting device is powered on;
    when no channel or application is selected by the user, a channel or application with a highest priority is selected as the auto launch item;
    wherein when only one channel or application has a highest click through rate or longest broadcasted time, the sole channel or application having the highest click through rate or longest broadcasted time is given the highest priority and is set as the auto launch item; or when multiple channels or applications have same highest click through rate or broadcasted time, a first priority is selected and given to a channel or application having an earliest broadcast start time among the channels or applications having equally high click through rate or long broadcasted time, and the channel or application having the earliest broadcast start time is given the highest priority and is set as the auto launch item.

11. The system for controlling the broadcasting of the network multi-media broadcasting device using the intelligent mobile terminal according to claim 10, wherein the control menu application program on the intelligent mobile terminal is downloaded from the server by the intelligent mobile terminal for controlling a content menu of the network multi-media broadcasting device, and wherein one control menu application program correspondingly controls one control menu; after the control menu application program is executed on the intelligent mobile terminal, the control menu application program provides a mouse cursor and/or a virtual keyboard allowing the user to control the content menu displayed by the network multi-media broadcasting device.

12. The system for controlling the broadcasting of the network multi-media broadcasting device using the intelligent mobile terminal according to claim 10, wherein the network multi-media broadcasting device provides multi-media content comprising at least a channel or an application, and wherein the channel or application comprises at least one of TV program, movie, Internet Protocol television (IPTV), on-line shop, TV application, Music Television (MTV), game, electronic books, music, radio program or on-line game.

13. The system for controlling the broadcasting of the network multi-media broadcasting device using the intelligent mobile terminal according to claim 10, wherein the network multi-media broadcasting device broadcasts program content received and at the same time displays a buffering status of program content that is being executed.

14. The system for controlling the broadcasting of the network multi-media broadcasting device using the intelligent mobile terminal according to claim 10, wherein data streaming of program content being buffered is controlled for initialization.

15. The system for controlling the broadcasting of the network multi-media broadcasting device using the intelligent mobile terminal according to claim 14, wherein when the program content is being broadcasted, control management is performed on the data stream of the program content.

16. The system for controlling the broadcasting of the network multi-media broadcasting device using the intelligent mobile terminal according to claim 10, wherein the intelligent mobile terminal controls the network multi-media broadcasting device for obtaining program content from the server, the server obtains information or status of the program content being broadcasted by the network multi-media broadcasting device.

17. The system for controlling the broadcasting of the network multi-media broadcasting device using the intelligent mobile terminal according to claim 10, wherein the intelligent mobile terminal controls a buffering process of the network multi-media broadcasting device.

18. The system for controlling the broadcasting of the network multi-media broadcasting device using the intelligent mobile terminal according to claim 10, wherein the intelligent mobile terminal is a smart phone or a tablet computer, and the server is a cloud server, wherein the intelligent mobile terminal performs wireless communication with the network multi-media broadcasting device and the server, and the network multi-media broadcasting device performs wired or wireless communication with the server, and wherein the wireless communications between the intelligent mobile terminal and the network multi-media broadcasting device, between the intelligent mobile terminal and the server, and between the network multi-media broadcasting device and the server are via Wi-Fi, Zigbee, Bluetooth (BT), Bluetooth low energy (BLE), Radio Frequency for Consumer Electronics (RF4CE), or 2.46 Hz RF.

19. The system for controlling the broadcasting of the network multi-media broadcasting device using the intelligent mobile terminal according to claim 10, the network multi-media broadcasting device is a network TV or a combination of a multi-media box and a TV, wherein the network TV comprises a central processor, and a memory, a wireless communication module, a monitor, a LAN interface module, an IR interface module and an RF interface module that electrically connect with the central processor respectively, and the multi-media box comprises a housing on which is provided with a HDMI interface, a sequence interface, an external memory socket and a power source interface.

* * * * *